(12) United States Patent
Pässler

(10) Patent No.: US 9,346,015 B2
(45) Date of Patent: May 24, 2016

(54) FILTERING DEVICE

(76) Inventor: Karlheinz Pässler, Heimbach (DE)

( * ) Notice: Subject to any disclaimer, the term of this patent is extended or adjusted under 35 U.S.C. 154(b) by 965 days.

(21) Appl. No.: 13/379,029

(22) PCT Filed: Jun. 18, 2010

(86) PCT No.: PCT/EP2010/004131
§ 371 (c)(1),
(2), (4) Date: Jul. 6, 2012

(87) PCT Pub. No.: WO2010/145850
PCT Pub. Date: Dec. 23, 2010

(65) Prior Publication Data
US 2012/0282146 A1    Nov. 8, 2012

(30) Foreign Application Priority Data

Jun. 20, 2009 (DE) .......................... 10 2009 025 680

(51) Int. Cl.
| | | |
|---|---|---|
| *B01D 46/34* | (2006.01) | |
| *B01D 53/88* | (2006.01) | |
| *B01D 46/00* | (2006.01) | |
| *B01D 46/30* | (2006.01) | |
| *B01D 53/04* | (2006.01) | |
| *B01D 53/86* | (2006.01) | |
| *B01J 8/00* | (2006.01) | |
| *B01J 8/02* | (2006.01) | |

(52) U.S. Cl.
CPC .......... *B01D 53/885* (2013.01); *B01D 46/0068* (2013.01); *B01D 46/30* (2013.01); *B01D 46/34* (2013.01); *B01D 53/0446* (2013.01); *B01D 53/8603* (2013.01); *B01D 53/8625* (2013.01); *B01D 53/8662* (2013.01); *B01J 8/002* (2013.01); *B01J 8/003* (2013.01); *B01J 8/0035* (2013.01); *B01J 8/0045* (2013.01); *B01J 8/0242* (2013.01); *B01D 2255/20723* (2013.01); *B01D 2257/20* (2013.01); *B01D 2257/30* (2013.01); *B01D 2257/404* (2013.01); *B01D 2259/4591* (2013.01); *B01J 2208/00752* (2013.01); *B01J2208/00761* (2013.01); *B01J 2208/00849* (2013.01)

(58) Field of Classification Search
CPC .... B01D 46/0068; B01D 46/30; B01D 46/34; B01D 53/0446; B01D 53/8603; B01D 53/8625; B01D 53/8662; B01D 53/885; B01J 8/002; B01J 8/003; B01J 8/0035; B01J 8/0045; B01J 8/0242
USPC ......... 422/168, 177, 178, 213, 216, 219, 232, 422/238, 239, 311; 55/484, 302, 303, 515, 55/516; 95/276, 279, 280; 423/215.5
See application file for complete search history.

(56) References Cited

U.S. PATENT DOCUMENTS 4,566,882 A * 1/1986 Hoffmann et al. ............ 422/219

FOREIGN PATENT DOCUMENTS

| DE | 3636467 | * | 4/1988 |
| DE | 10 2005 020350 | * | 11/2006 |
| DE | 10 2005 022138 | * | 11/2006 |

*Primary Examiner* — Jill Warden
*Assistant Examiner* — Joye L Woodard
(74) *Attorney, Agent, or Firm* — Thompson & Thompson Patents

(57) ABSTRACT

The invention relates to a filtering device for a variety of polluted gasses, with an inclined bed with a filling of catalytic material, which bed has a retaining wall at its lower longer side, with a clean-gas exit positioned in the area of one front side of the bed, which ejects the gas which has passed through the filling, and with a flush-gas entrance also positioned in the area of one front side of the bed, the flush-gas entrance (40) and the clean-gas exit (36) being provided at the same front side (38), and beneath the bed (12), current-influencing devices (50) being positioned spread between the two front sides, which devices prevent or at least reduce current peaks in the flow of flush gas through the bed (12).

11 Claims, 13 Drawing Sheets

FILTERING DEVICE

TECHNICAL FIELD

The invention relates to a filtering devicefor multiply polluted gasses, with an inclined bed with a filling of catalytic material, which bed has a retaining wall at its lower longer side, with a clean-gas exit positioned in the area of one front side of the bed, which ejects the gas which has passed through the filling, and with a flush-gas entrance also positioned in the area of one front side of the bed.

BACKGROUND OF THE INVENTION

Such a filtering device is known for instance from DE 10 2005 022 138 A1. This filtering device is characterized in that it is particularly suited for filtering out dust, dioxins, nitrogen oxides or the like, in particular from blast-furnace waste gasses or waste-incinerating plants. For this purpose, it has a number of inclined beds which are provided with a filling of catalytic material. At the lower longer side of the bed, the catalytic material borders a retaining wall each, and the bed is penetrated by a flow or current from top to bottom in order to achieve the desired filtering effect.

If the catalytic material is clogged, in particular due to the resulting dust, a flush gas is supplied through the bed from bottom to top. As a result, the uppermost and compressed layer of catalytic material is slightly lifted and will slide off over the retaining wall.

Obviously the angle of repose of the filling material must correspond to the angle of inclination of the bed in order to secure an optimal operation.

For industrial use, such filtering devices are of considerable lengths. For example, a bed can be six meters or even ten meters long in the longitudinal direction, with the width then amounting to one meter, for instance. The bed which is inclined, perceived in a cross direction, is then underflushed over its entire length, i.e. over six or ten meters, by the flush gas, and the flush gas penetrates gradually through the bed from underneath.

In order to guarantee a safe lifting of the compression layer, it has been suggested to work with flush-gas impulses. This results in a slightly more even removal of the compression layer, but the pressure wave thus created will cause also catalytic material which is not yet worn out to be catapulted off, such that the resulting losses are too high.

In order to improve the cleaning of the filling, it has also been suggested to attach flush-gas entrances laterally, i.e. along the lower longer side of the bed, for instance. However, this is unfavourable in the process because such entrances are then easily polluted by the compression layer sliding downwards, and if the flush-gas impulse is kept very short, such that no flush gas is flowing any more when the compression layer slides down, parts of the compressed granules will inevitably enter the flush-gas apertures. In addition, a large number of flush-gas pipe connections at the outer side of the filter box makes it necessary to have a corresponding number of sealings, pipe diversions and branchings and is insofar unfavourable to put into practice.

OBJECTS AND SUMMARY OF THE INVENTION

In contrast to this, the present invention has the task of creating a filtering device making possible a reliable cleaning operation without any additional costs arising, but with the longevity of the filtering device being improved in particular also in case of waste gasses containing sulfur and chlorine.

In accordance with the invention, the flush-gas entrance is supposed to be provided at the same side as the clean-gas exit. The clean gas leaves the filter box at a temperature which is not notably below the entry temperature of the polluted gasses, for instance, thus, at 160° C. This temperature is clearly above the dew point of sulfur, such that a condensation into sulfuric acid is not possible even at what is referred to as "cold spots". Surprisingly, the flush-gas is heated to such a degree as a result of its being supplied in the "counterflow principle", that also the flush gas is at a correspondingly elevated temperature.

In a preferred embodiment, clean gas is used as flush gas, which clean gas is branched off from parallel beds. This clean gas has the desired temperature of about 160° C. in the first place, and it is obvious that also a temperature of for example 130° C. would basically be sufficient.

Compared with basically known filtering devices which are suitable for multiply polluted gasses and which require temperatures of about 320° to 340° C., this leads therefore to considerable energy savings because the basically known filtering devices require the waste gasses to be re-heated.

In accordance with the present invention, it is particularly favourable to have, in addition to the flush-gas entrance and the clean-gas exit being provided at the same front side of the bed which is positioned inclined perceived in the cross direction, current-influencing devices provided in the free space beneath the bed. Such current-influencing devices serve to guarantee a secure removal of the compression layer over the entire and considerable length of the bed, so that the compression layer can slide off as a whole and no parts remain in place.

Although the compression layer has a certain internal cohesion, it tends to be torn into pieces in filtering devices realized so far, surprisingly especially at the front side opposite the flush-gas entrance. In accordance with the present invention, the basically desired flush-gas impulse is actually slowed down now, and as a result the apparently punctually dynamically created lifting impulse is moderated. It is possible that up to now, a standing wave was created due to resonances, whose antinodes led to a partial removal of the compression layer, whereas in accordance with the present invention, the removal impulses are now surprisingly reduced or "feathered" with the help of the flush-current influencing devices.

Surprisingly, the compression layer is still reliably removed, even though the peaks of the removal impulse are clearly reduced.

Surprisingly, even a mere division of the flush-gas current into individual currents is suitable to achieve this, for which purpose the current-influencing devices are suited, which are exemplarily provided in the form of baffle plates. The flush-gas current is divided by such baffle plates and is supplied to the bed in individual currents from underneath. The baffle plates are then preferably provided beneath the respective beds, however not diagonally beneath, such that they are not hit either by the compression layer sliding down.

For further explanations, reference is made to DE 10 2005 022 138 A1. The current-influencing devices prevent current peaks in the current of flush-gas washed through the bed, and it becomes obvious that surprisingly the compression layer is then completely lifted off more easily as a result, basically as a coherent layer, and can therefore slide off. Due to the prevention of peaks, a basically identical pressure is built up beneath the compression layer, which pressure cannot escape either through holes in the compression layer created by current peaks.

In accordance with the present invention, a more reliable and improved cleaning of the filling is thus surprisingly achieved.

In a preferred embodiment, it is in addition intended to use and clean the compression layer, which is drained off in a basically known fashion via a conveyor screw, in a partial circulation. For this purpose, this part can for instance be heated to an increased temperature of 300° C.; the dust collected can be blown out or washed out, and the polluted gas created by the further heating can be collected and exerted by means of re-condensation at a cold spot.

This also permits an at least partial re-use of the granules, with fresh granules being preferably inserted into the circulation.

In accordance with the present invention, it is particularly preferable that a large number of pollutants can be removed from waste gasses with the help of one compact filter box, for instance dioxins and furans, nitrogen oxides, sulfuric compounds, chloric compounds, and in particular also dust and if necessary even CO.

In particular, the denox filters known so far did not permit to filter out dust at the same time, such that this means a considerable improvement insofar. In addition, the production costs of the filtering device in accordance with the present invention are reduced by 50% compared with classical denox or desox filtering devices.

In accordance with the present invention, it is favourable in a preferred embodiment to have the circulating gradient reduced, and also to have multiple small vertical channels provided next to each other in the bed. The vertical longitudinal and cross ribs make it possible to arrange the currents in parallel, even though this is realized over only few centimeters in height.

In a modified embodiment, it is intended to realize as the current-influencing device a nozzle slide driving in a longitudinal direction along beneath the bed. It is provided with a slot nozzle of the same width as the bed, i.e. 1 m for instance, which is penetrated by a rather strong flow. In this case, it is acceptable, in contrast to the present invention, that the compression layer gets torn. The current created is so strong, however, that no parts of the compression layer will remain in place despite this, and also in this case clean gas from parallel beds can be used as the flush gas.

Further advantages, details and features of the present invention will become clearer from the following detailed description of several embodiments of the present invention in connection with the attached drawings, which show:

DETAILED DESCRIPTION

Figure 1:
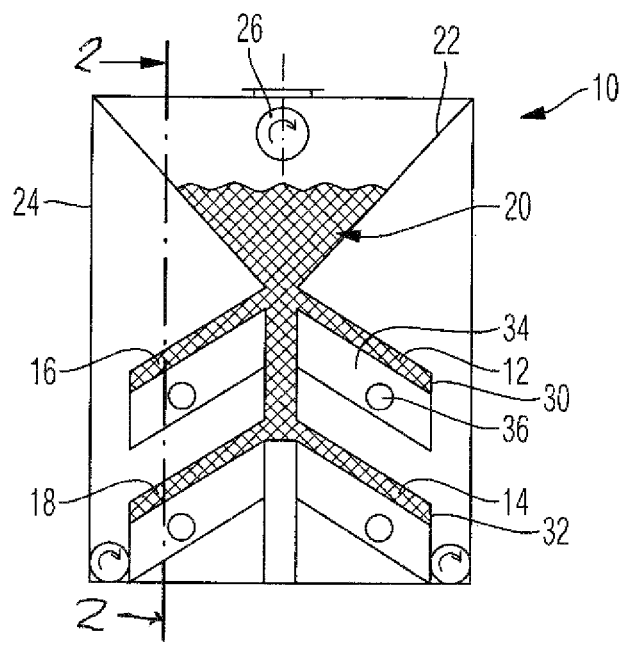
FIG. 1 is a section through a first embodiment of a filtering device in accordance with the present invention.

The embodiment of a filtering device 10 in accordance with the present invention depicted in FIG. 1 has several inclined beds 12, 14, 16 and 18 which extend in a firtree-like fashion in the exemplary embodiment shown. A filling 20 made up of catalytic material is provided which is supplied in a uniform fashion in an insertion hopper 22 along the length of filter box 24. For this purpose, the individual hopper 22 is provided with a dosing screw 26 extending in the longitudinal direction of filter box 24 and serving for the uniform supply of filling 20.

The catalytic material of filling 20 slides onto beds 12 and 18 in a basically known fashion, with the inclination of the beds corresponding to the filling angle of the catalytic material. At the lower longitudinal side 30 of each bed, a retaining wall 32 is provided, which needs not be formed in a vertical position, but which may for instance also extend horizontally, as can be taken from the above-mentioned disclosure to which reference is made.

Beneath each bed, a free space is provided, such as for example free space 34 beneath bed 12, which is in each case closed gas-tight at its bottom side as well as on all front sides. Free space 34 has a parallelepiped-shaped cross section and a width of about 1 m—corresponding to the width of the bed. Bed 12 has a grate made up of a grid, with the longitudinal and cross ribs having a height of about 3 cm each. This grate is covered by a large-surface sieve holding the filling.

In normal operation, bed 12 is penetrated by gas diagonally from top to bottom, i.e. from above bed 12 into free space 34. In this fashion, a clean gas is created which is output through clean-gas exit 36. In the normal operation or filtering operation, the incoming dust will be collected on the upper surface of the filling in bed 12, in such a fashion that a compression layer will form there.

In the cleaning operation, the direction of the current through bed 12 is inversed, and flush gas enters free space 34 and will flow through bed 12 from bottom to top.

Figure 2:
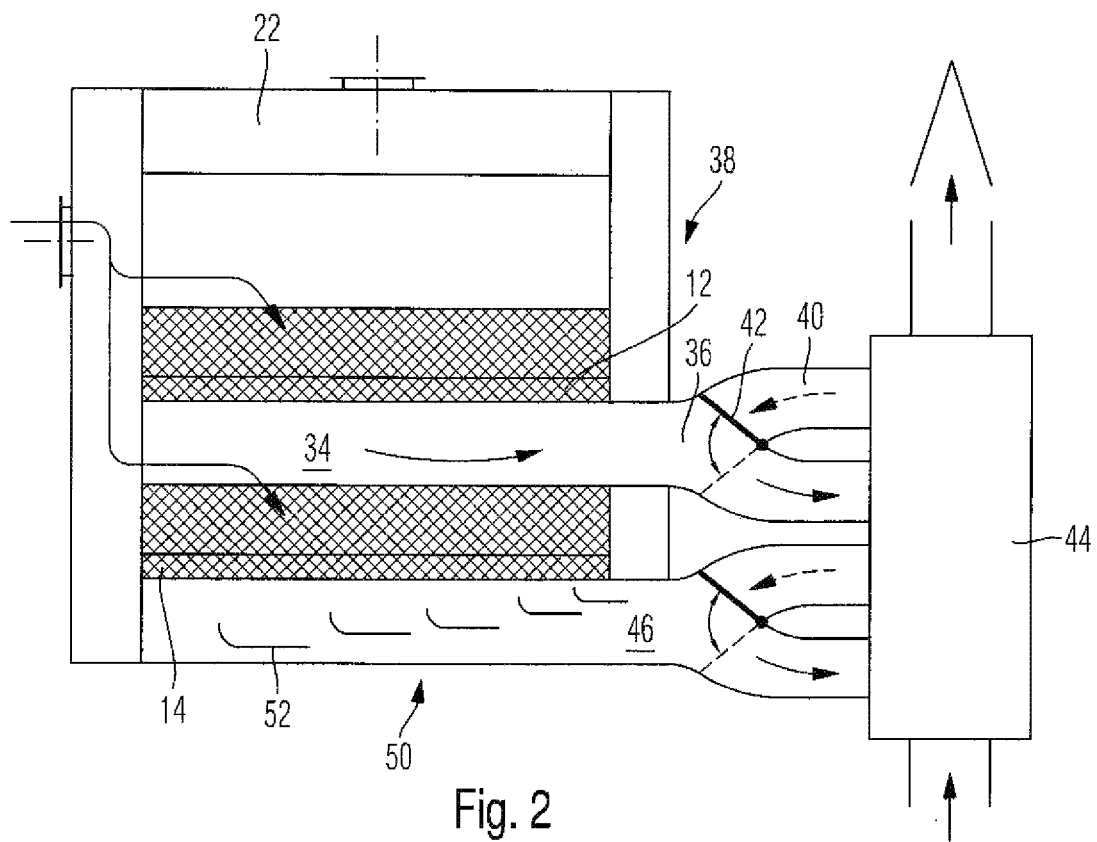
FIG. 2 is a longitudinal section through taken along the line 2-2 in the embodiment of FIG. 1.

From FIG. 2, the arrangement in accordance with the present invention becomes clear in detail. The clean gas flows out from free space 34 through clean-gas exit 36. In the area of the same front side 38 of bed 12, a flush-gas entrance 40 is provided, with a switching between flush gas and clean gas made possible with the help of a combined switching damper 42. The current of flush gas is depicted in broken lines, whereas the current of clean gas is depicted by a black arrow.

Adjacent to the flush-gas entrances and clean-gas exits, a collection and switching box 44 is provided. With the help of collection and switching box 44, it is possible to selectively switch one of the beds into cleaning operation. For this purpose, the clean gas is collected from three beds and a portion of the clean gas is supplied to bed 12 as flush gas, with combined switching damper 42 being brought into the position depicted in broken lines, and the flush gas being supplied to free space 34 via flush-gas entrance 40.

Each free space has current-influencing devices 50 depicted for free space 46 by way of example. In the embodiment shown, air baffle plates 52 are provided over the length of bed 14, i.e. spread over about 6 m, which plates divide the entering flush-gas current into individual currents and supply them to bed 14 angularly from underneath. This surprisingly results in the compression layer positioned on bed 14 being uniformly lifted and thus sliding off better.

Obviously, any other current-influencing devices can be provided instead. For instance, a current resistance can be provided by means of ribs, orifices or the like, or a diversion of air may be realized.

Figure 3:
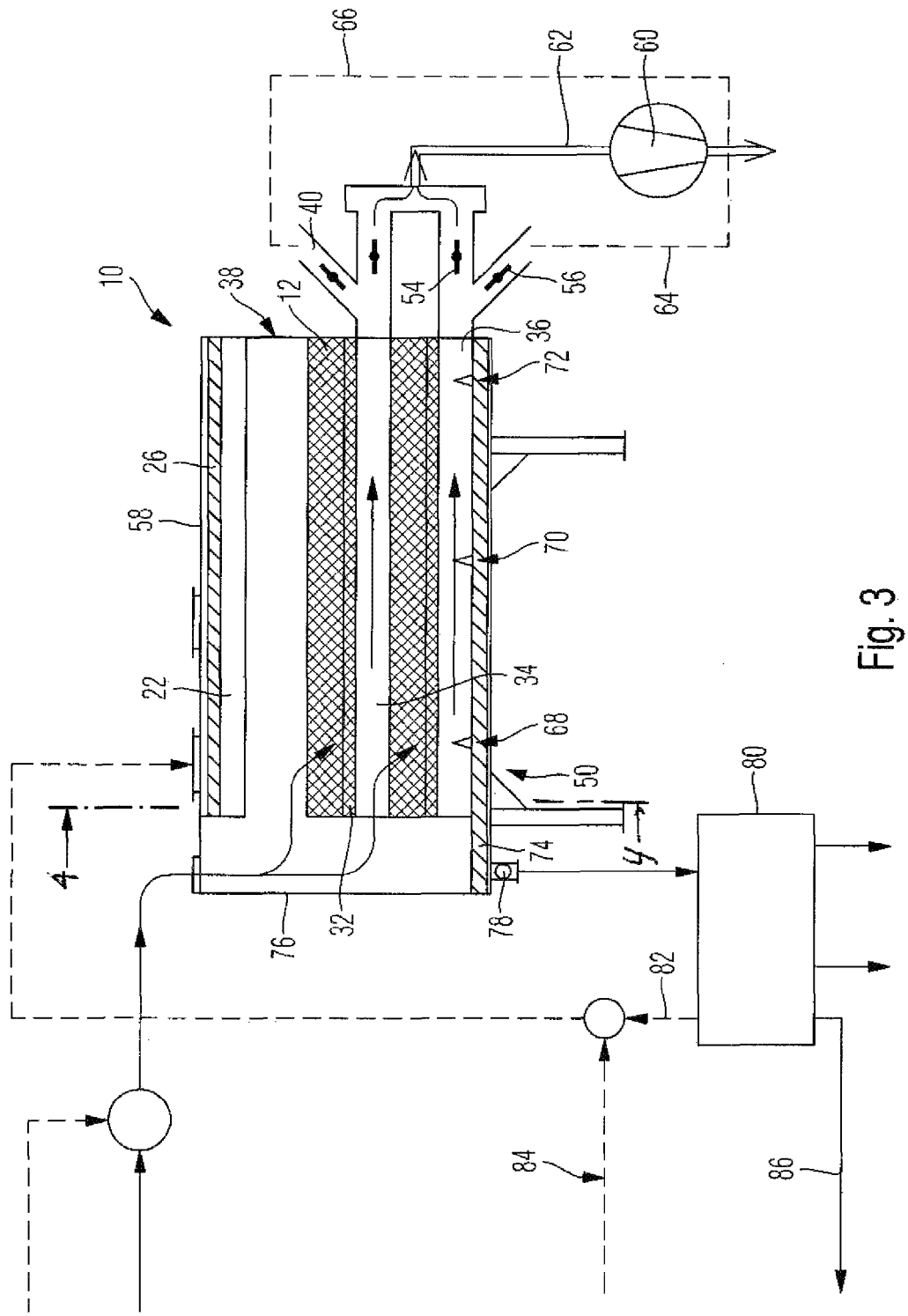
FIG. 3 is a schematic view of another embodiment of a filtering device in accordance with the present invention.

From FIG. 3 it can be taken that a partial circulation can be formed for the granules as well as a partial circulation for the clean gas. Same numbers in the figure indicate here, as well as in other figures, same components. Instead of combined switching damper 42, one switching damper 54 for clean gas and one switching damper 56 for flush gas are provided in this embodiment. Clean-gas exit 36 and flush-gas entrance 40 are combined as fare as their connection is concerned, and the branching is realized few centimeters behind the connection at front side 38 of filter box 58. As can be seen, filtering device 10 in accordance with the present invention can basically be placed in a rectangular filter box 58 which may have, for example, a width of some more than 2 m, a height of 3 m and a length of 6 m in order to operate a rather small waste-incinerating plant, i.e. it can be placed in an otherwise common standard container.

The separation of combined switching damper 42 into individual switching dampers 54 and 56 makes it possible as well to specifically switch on the cleaning operation of one of the beds. In the filtering operation, all four switching dampers 56 are closed, and all four switching dampers 54 are open. In the cleaning operation, the switching damper 56 of one bed is open, and correspondingly the switching damper 54 of this bed is closed. Via a compressor 60, the pressure of clean gas 62 is increased, and on the exit side of the compressor, two pipes 64 and 66 branch off which are connected with flush-gas entrances 40 each. When switching damper 56 is open, the compressed clean gas will therefore flow through the respective flush-gas entrance 40 into free space 34 as flush gas. There it arrives at current-influencing devices 50 which in the exemplary embodiment shown are realized by means of current resistances 68, 70, 72 positioned in a spread arrangement. The rib-shaped current resistances 68 to 72 break the flush-gas impulse, such that no current peak will penetrate the bed.

Furthermore, it becomes clear from FIG. 3 that the compressed granules sliding off over retaining wall 32 are transported away via a conveyor screw 74. They are collected in the area of front side 76 of filter box 58 and leave filter box 58 when a revolving valve 78 is opened. In a recovery or purification box 80, the compressed granules are recovered or purified in a suitable fashion, for instance by means of washing, sieving and/or heating. The suitable portions of granules leave recovery or purification box 80 via a return pipe 82. Fresh granules or catalytic material are/is supplied via a feed pipe 84 and are/is supplied to insertion hopper 22 the circulation together with the returned granules.

The filtering device is characterized in that the filling contains vanadiumpentoxide which filters out and/or chemically transforms dust, NOx as well as dioxins, and is provided in the form of granules.

Moreover, in recovery or purification box 80, the worn-out granules are separated and are output via a pipe 86. By means of vaporization of the respective salts, dust and gas containing sulfur, chlorine and/or fluorine are created and separated and are condensed separately, if necessary.

Figure 4:
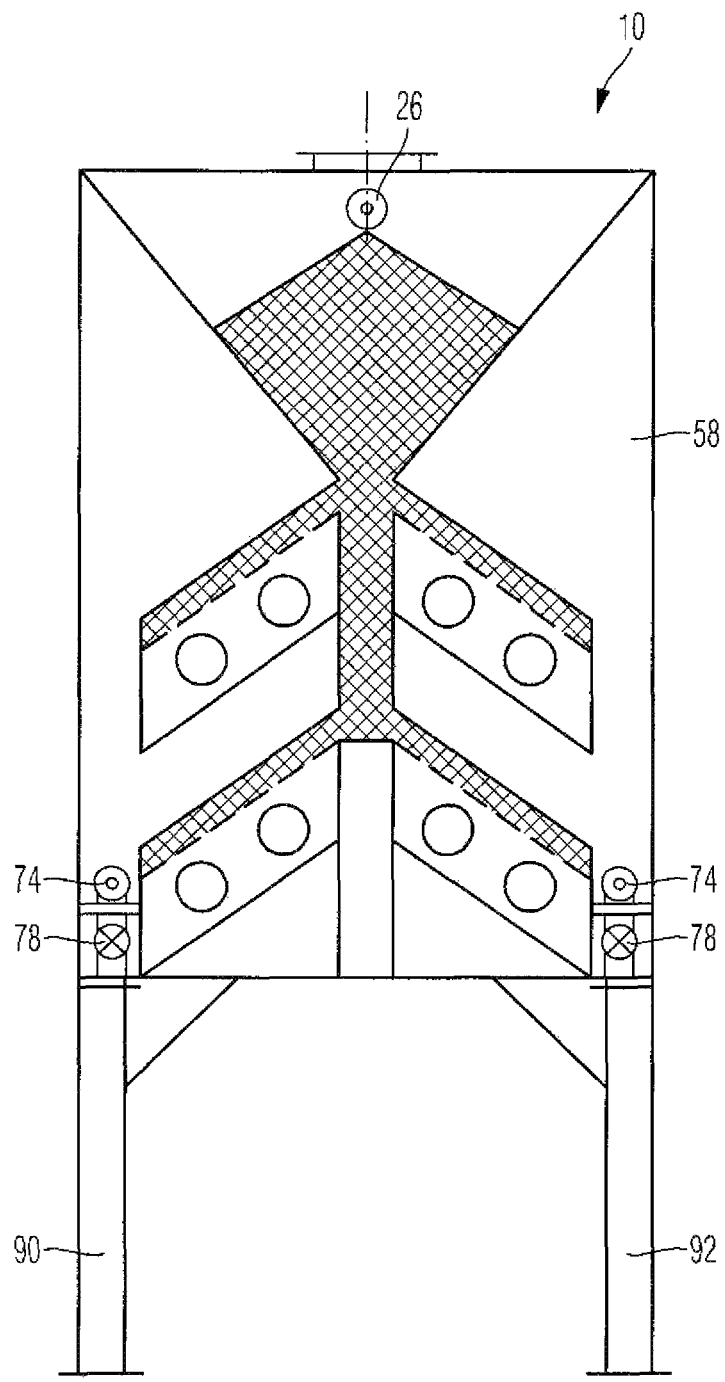
FIG. 4 is a section taken along the line 4-4 in FIG. 3.

From FIG. 4 it becomes clear that both the conveyor screws 84 and the revolving valves 78 are provided on both sides of filter box 58; it also becomes clear that the filtering device 10 in accordance with the present invention can be put up in a compact fashion with the help of supports 90 and 92.

Figure 5:
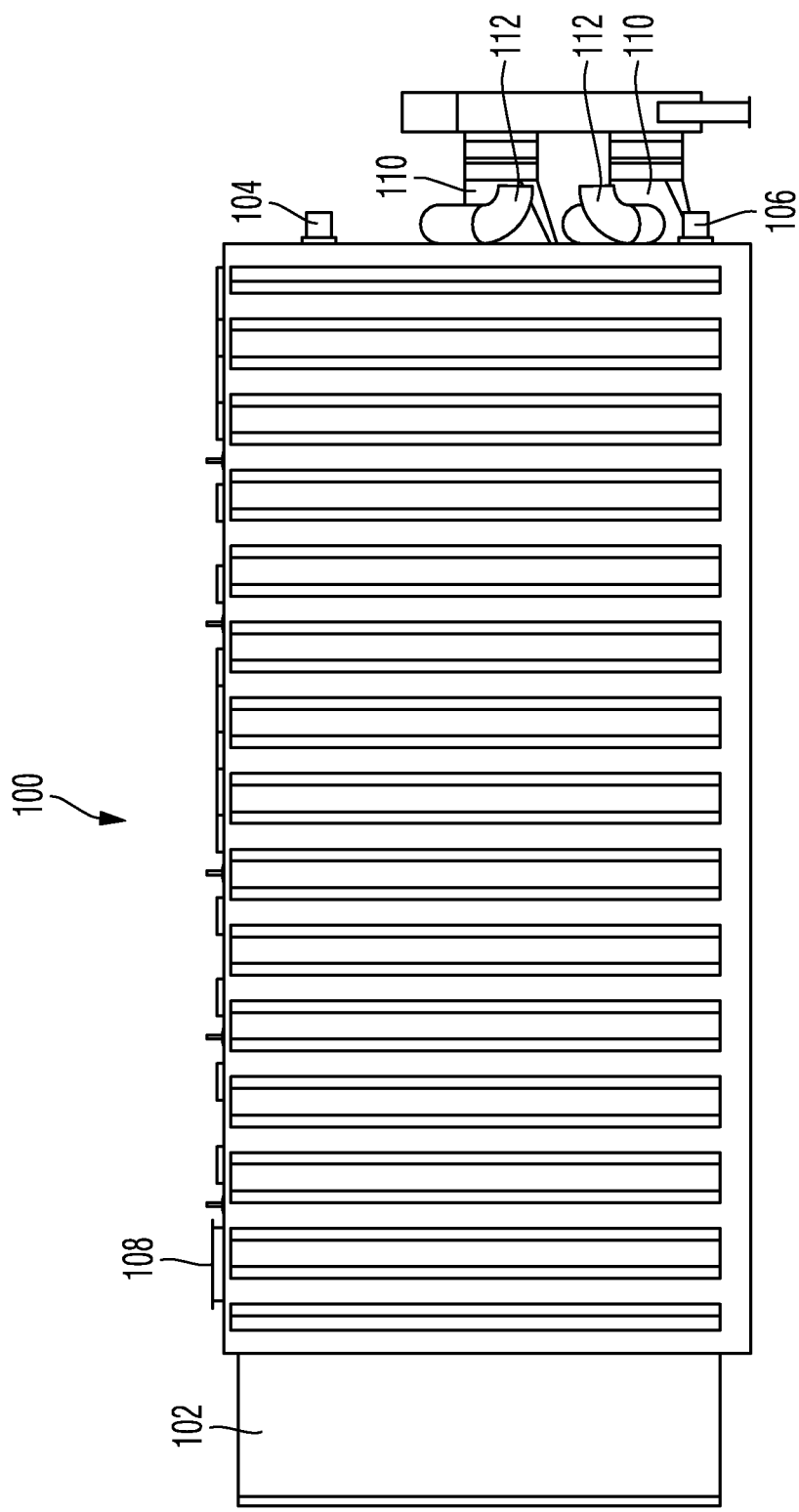
FIG. 5 is the side view of an embodiment of the filtering device in accordance with the present invention, integrated in a container.

FIG. 5 shows a side view of a standard container 100, which takes the function of filter box 24 of FIG. 1 here, with opened doors 102 at its front side. At the opposite front side of container 100, the drive motor 104 of dosing screw 26, one of the two drive motors 106 of conveyor screw 74 as well as one of the two raw-gas entrances 108 and clean-gas exits 110 as well as flush-gas entrances 112 are visible.

Figure 6:
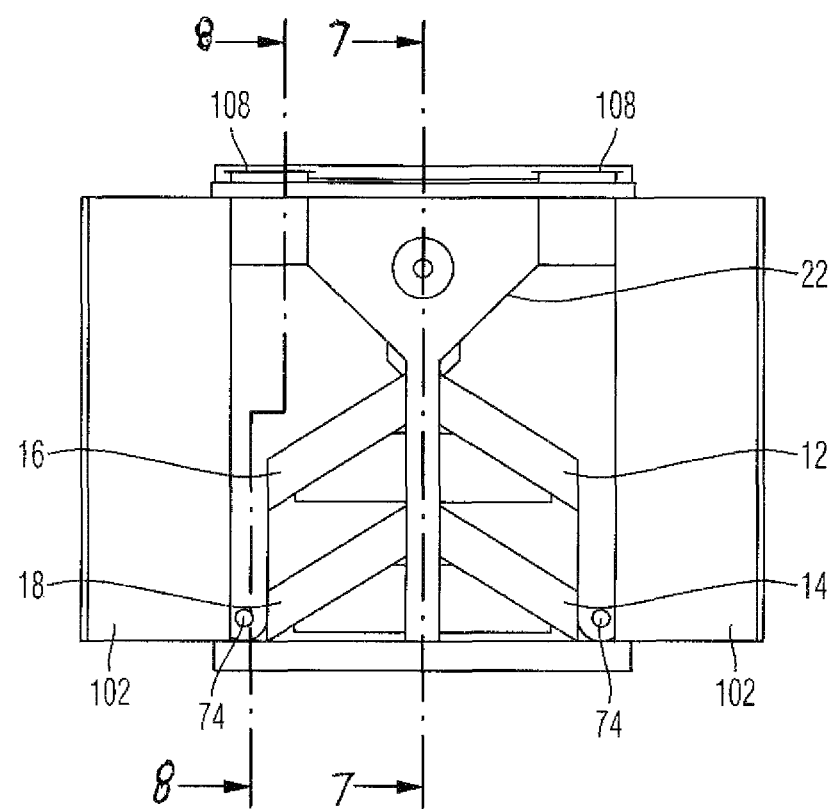
FIG. 6 is a view from the left to the embodiment of FIG. 5, with an indicated interior structure of the filtering device in accordance with the present invention.

In FIG. 6, beds 12, 14, 16, 18 as well as insertion hopper 22 and conveyor screws 74 are indicated besides the two raw-gas entrances 108.

Figure 7:
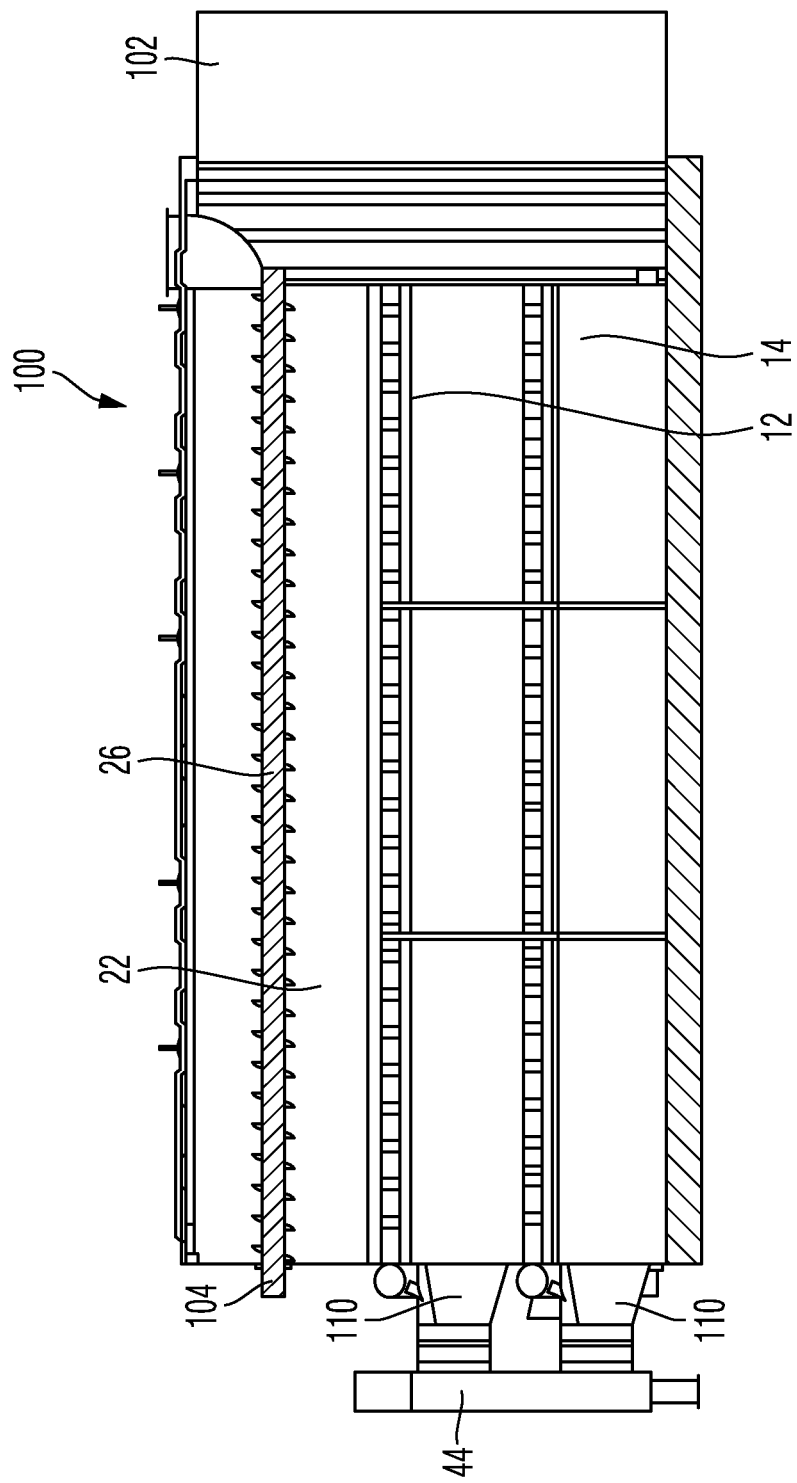
FIG. 7 is a section through the embodiment of FIG. 5 along the cutting line 7-7 of FIG. 6.

From FIG. 7 it can clearly be taken how dosing screw 26 extends over the entire length of the beds of which beds 12 and 14 are perceivable. Dosing screw 26 is driven with the help of motor 104 which is positioned outside container 100, in order to uniformly supply the catalyst poured into insertion hopper 22, whose one wall is depicted behind dosing screw 26, over the entire length of the beds. At the same front side of container 100, moreover, beneath dosing-screw motor 104, clean-gas exits 100 are perceivable which lead into common collection and switching box 44 at which the cleaned gas of all four filter beds can be led out collectively.

Figure 8:
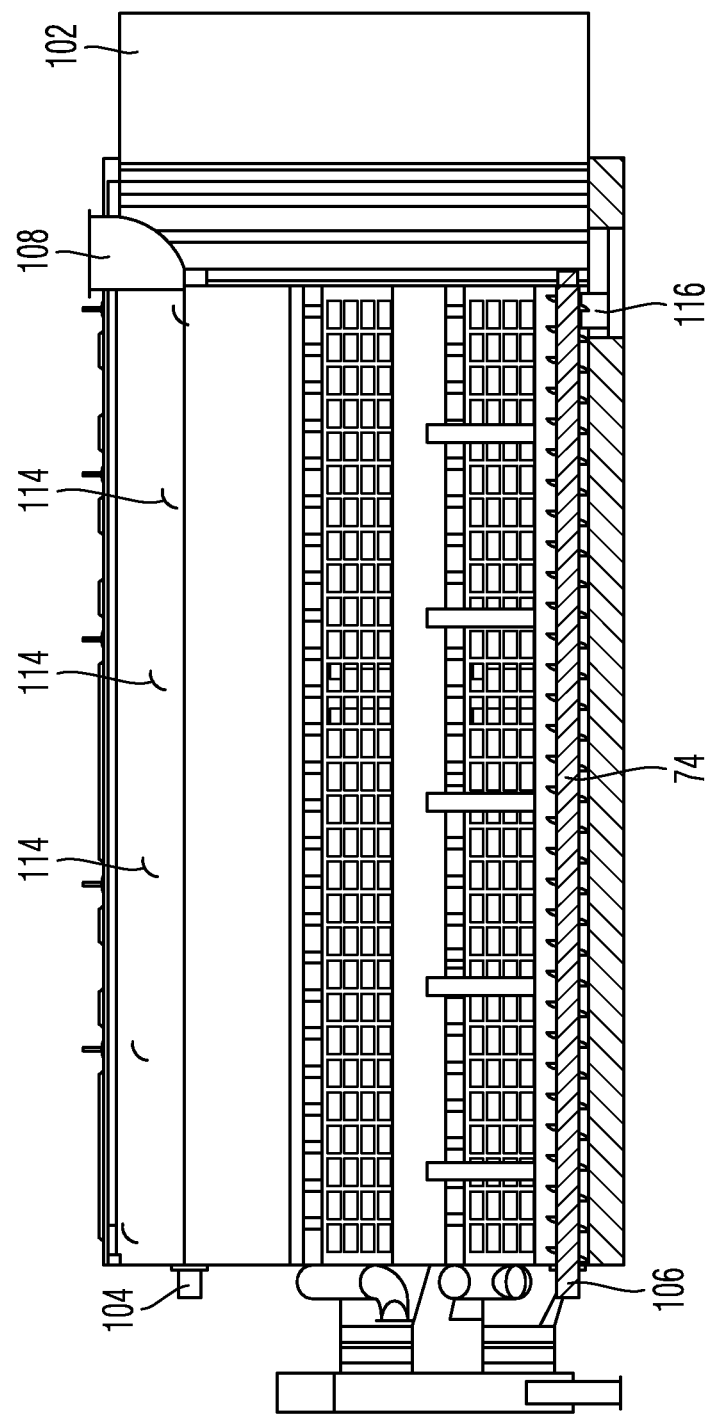
FIG. 8 is a section through the embodiment of FIG. 5 along the cutting line 8-8 of FIG. 6.

In FIG. 8, beneath the container ceiling, current-influencing devices 114 serving to even out the current of raw gas supplied can be seen. Also well visible in FIG. 8 is one of the two conveyor screws 74 (shown cut-through here) which also extend over the entire length of beds 12, 14, 16, 18. With the help of conveyor screws 74 and their drive motors 106, the worn-out catalytic material is transported away and is supplied to a possible recovery or purification. Through apertures 116 in the bottom surface of the container, the worn-out catalytic material is transported out of the inside of the container.

Figure 9:
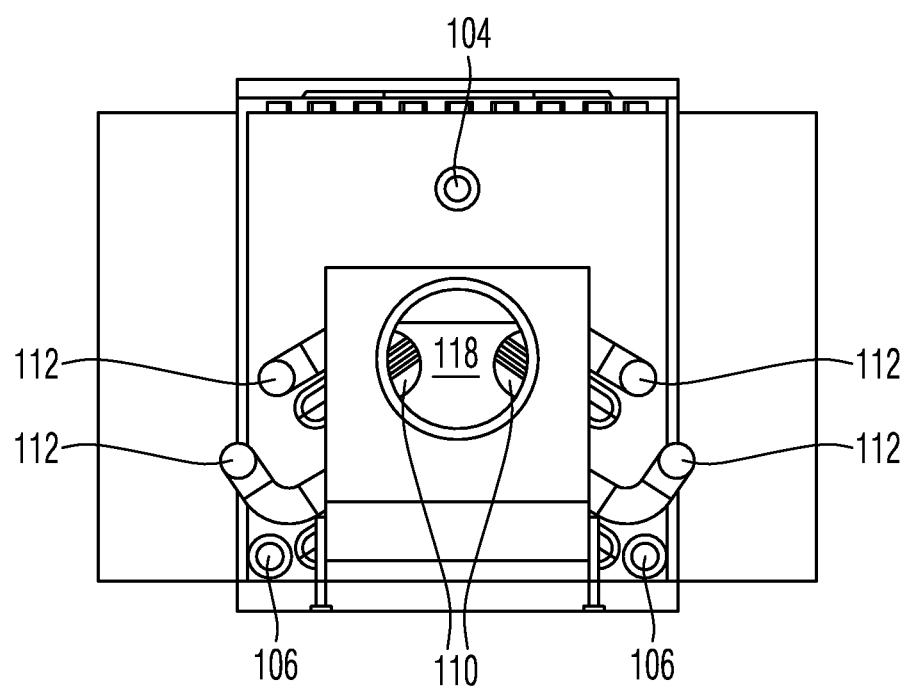
FIG. 9 is a view from the right to the embodiment of FIG. 5.

From FIG. 9, collection box 44 is clearly visible. A pipe for further transport of the clean gas can for example be flange-connected to circular aperture 118. In circular aperture 118, two of the total of four clean-gas exits 110 are perceivable which expand to the width of the free spaces 34 positioned beneath the filter beds. The inclined pipes 112 which are positioned above the individual clean-gas exits, respectively, serve the purpose of supplying the flush gas to the individual filter beds. At the two lower corners of the container, the drive motors 106 of conveyor screws 74 are well visible. In the top centre portion, the drive motor 104 of dosing screw 26 is furthermore clearly perceivable.

Figure 10:
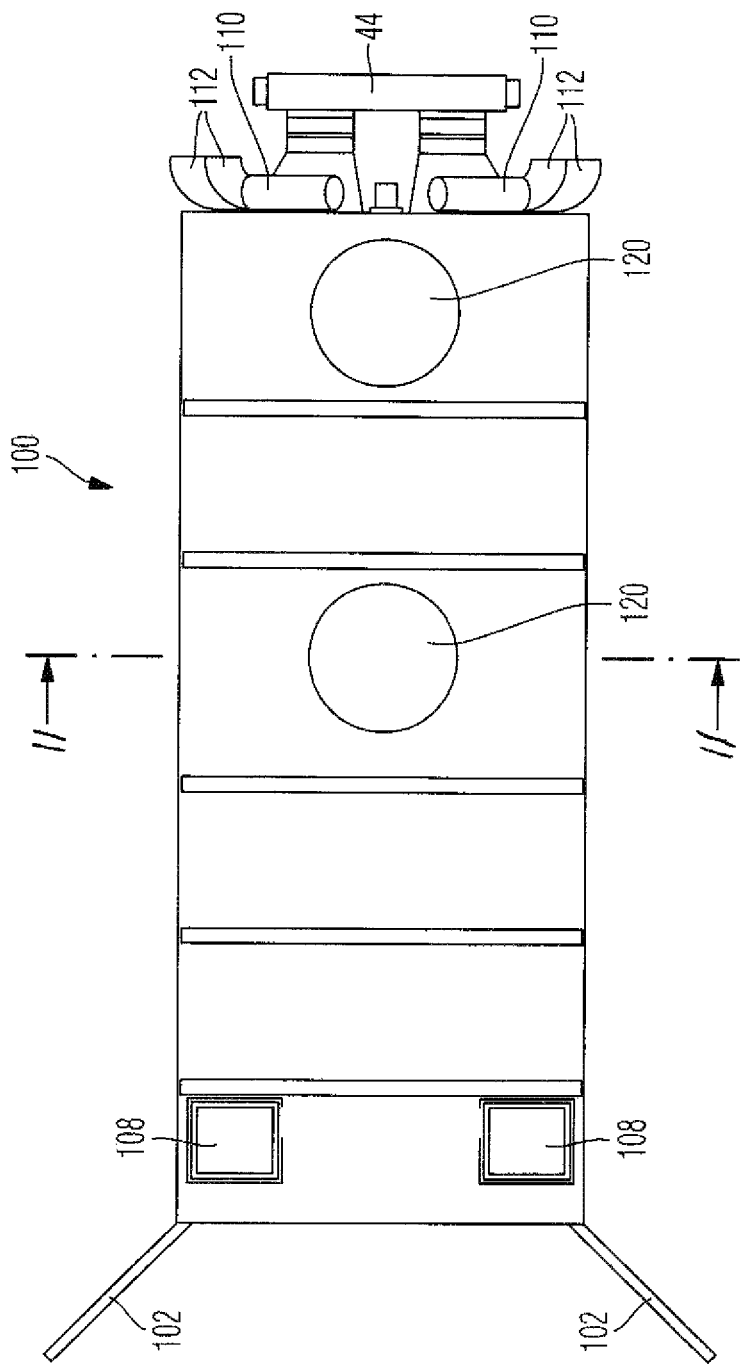
FIG. 10 is a top view of the embodiment of FIG. 5.

FIG. 10 shows a top view onto container 100 on the top surface of which the two raw-gas entrances 108 as well as two flange openings 120 (closed with plates here) for filling in the catalyst are perceivable. On the right side, clean-gas exits 110 whose diameters are reduced towards common switching and collection box 44 as well as the four flush-gas entrances 112 can be perceived clearly.

Figure 11:
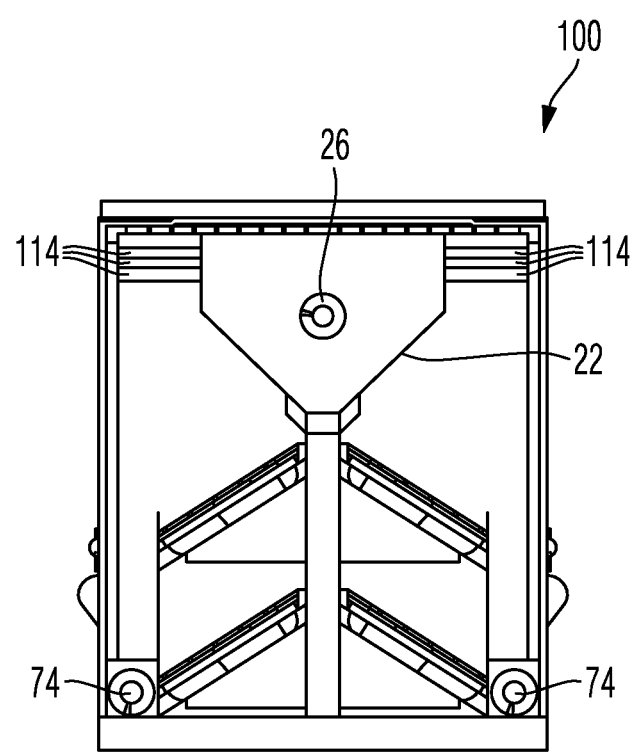
FIG. 11 is a section through the embodiment of FIG. 5 along the cutting line 11-11 of FIG. 10.

FIG. 11 shows container 100, cut through along line B-B in FIG. 10. The two conveyor screws 74 on the left and right sides at the bottom of container 100 as well as dosing screw 26 in the centre of insertion hopper 22 can be perceived clearly. By means of to-and-fro movements of dosing screw 26, the catalytic material can be moved to both the front and back ends of insertion hopper 22 in a preferred embodiment of the present invention, in order to guarantee a good and equal spreading of the amount of catalytic material over the entire length of insertion hopper 22. Immediately beneath the container ceiling, at the right and left sides next to the insertion hopper, the thin blades of current-influencing devices 114 for evening out the raw-gas supply current are furthermore visible.

Figure 12:
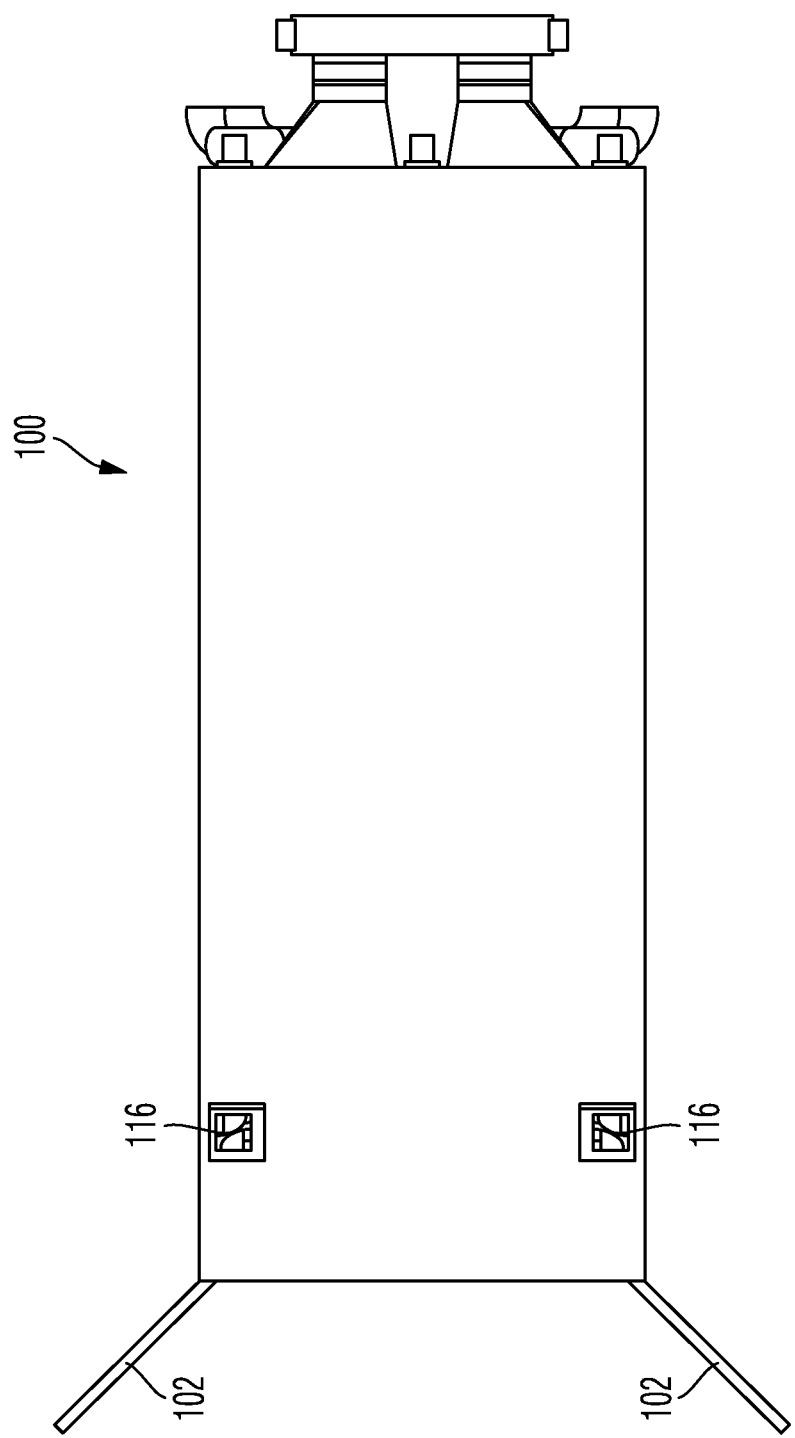
FIG. 12 is the bottom view of the embodiment of FIG. 5.

From FIG. 12, exit apertures 116 for the worn-out catalytic material in the bottom surface of container 100 can be seen well once more. Here, in another preferred embodiment of the present invention, devices for recovery or purification of the catalytic material may be connected in order to re-supply this to the filter in accordance with the present invention for further use.

Figure 13:
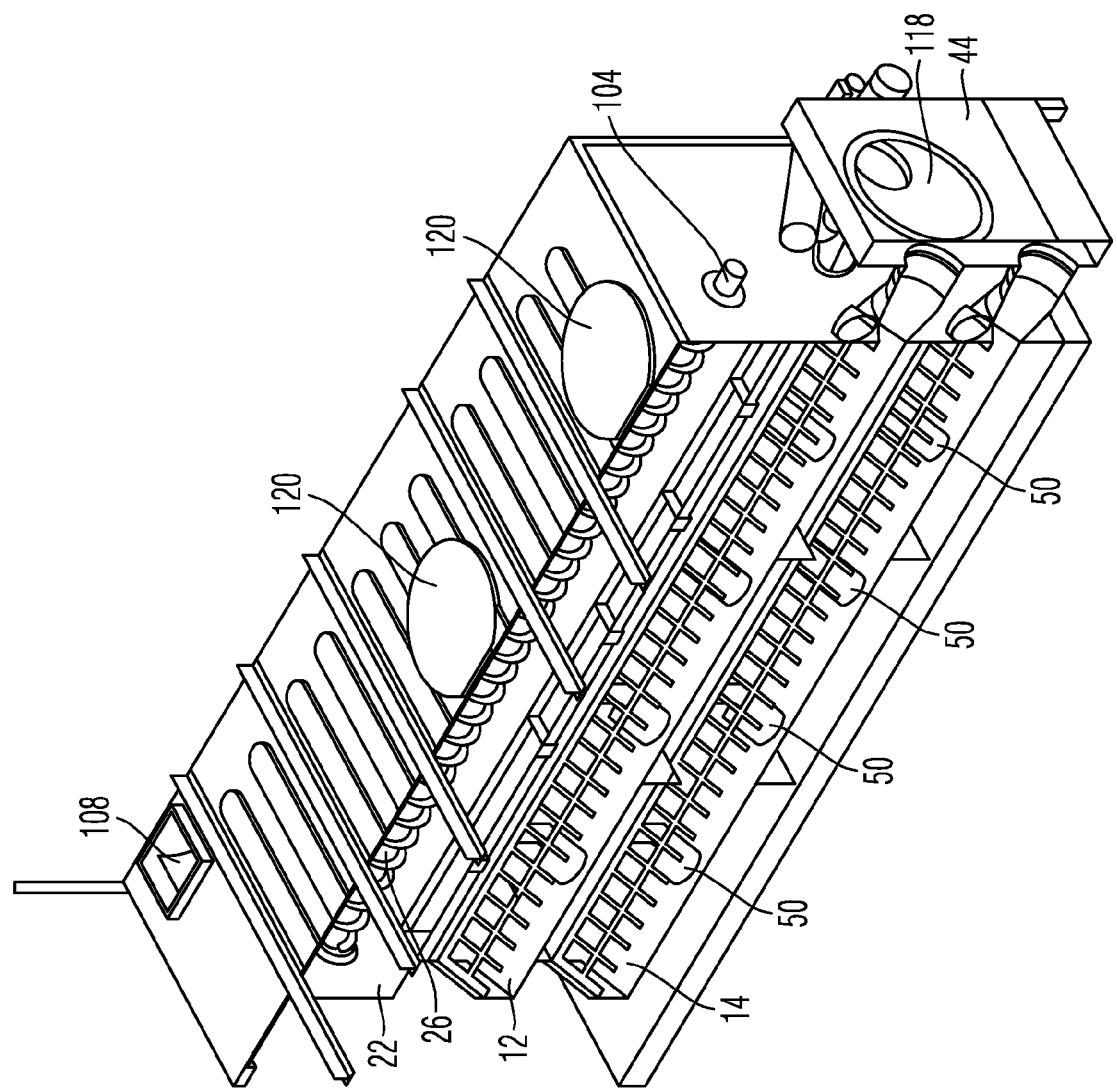
FIG. 13 is a perspective section through the filtering device of FIG. 5 cutting line of FIG. 6.

From FIG. 13, besides dosing screw 26 positioned inside insertion hopper 22, the current-influencing devices 50 arranged beneath the grates of filter beds 12, 14 (depicted here), which devices are shaped as thin blades in the embodiment depicted and which are numbered only for bed 14 for reasons of clarity, can be perceived. Through these current-influencing devices 50, on the one hand, the flush-gas impulse is evened out over the entire length of the filter beds, and on the other hand, the slope of the flow of flush gas arising is "flattened", which in accordance with the present invention surprisingly leads to a large area of the compression layer of the catalytic material on the filter beds to be cleaned being lifted off.

In another modified embodiment (not depicted), the raw gas entering the container from the top can first penetrate the upper filter bed, then, instead of immediately being lead out of the inside of the container via the clean-gas exit, be supplied to the lower filter bed for further cleaning of the now already pre-cleaned gas, and in this fashion two filter beds can be cascaded and the cleaning effect can be increased significantly. Obviously, for this purpose one side wall of the otherwise gas-tight free space beneath the upper filter bed must have apertures through which the pre-cleaned gas can flow to the second filter bed via the separation devices mentioned.

Figure 14:
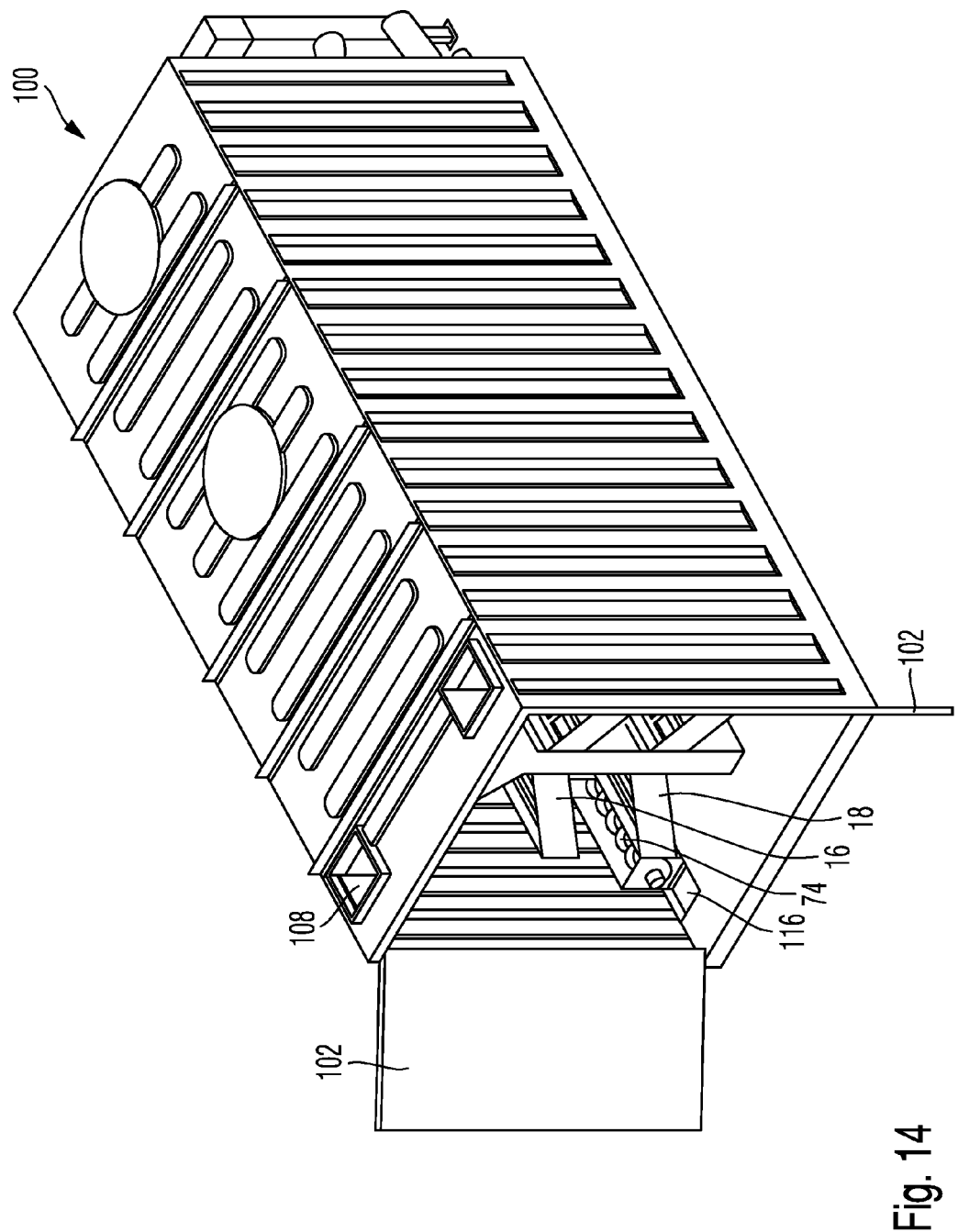
FIG. 14 is a perspective view of the container of FIG. 5.

FIG. 14 shows once more a perspective view of the embodiment of the filter in accordance with the present invention in standard container 100. Back conveyor screw 74, which transports to the outside worn-out catalytic material taken off filter beds 16 and 18 via exit aperture 116 in the bottom of the container, is clearly visible.

While a preferred form of this invention has been described above and shown in the accompanying drawings, it should be understood that applicant does not intend to be limited to the particular details described above and illustrated in the accompanying drawings, but intends to be limited only to the scope of the invention as defined by the following claims. In this regard, the terms as used in the claims are intended to include not only the designs illustrated in the drawings of this application and the equivalent designs discussed in the text, but are also intended to cover other equivalents now known to those skilled in the art, or those equivalents which may become known to those skilled in the art in the future.

What is claimed is:

1. Filtering device for a variety of polluted gasses, the filtering device comprising:
   a filter box having opposed front sides,
   a gas penetrable inclined bed having opposed front sides disposed within the filter box such that the opposed front sides of the inclined bed correspond with the opposed front sides of the filter box, the bed further comprising a filling of catalytic material and a retaining wall for the filling of catalytic material extending between the opposed front sides of the inclined bed at a lower longer side of the bed,
   a polluted gas inlet for introducing polluted gas into the inclined bed for passage through the inclined bed and the filling of catalytic material, and a clean-gas outlet for ejecting clean gas which has passed through the inclined bed and the filling of catalytic material, and
   a flush-gas inlet for introducing a flush gas in the area of one front side of the inclined bed for passing the flush-gas through the inclined bed and the filling of catalytic material,
   wherein the inclined bed extends above a free space, and wherein the free space is closed gas-tight at its bottom side and on all front sides, the free space having a parallelepiped-shaped cross-section,
   wherein, beneath the bed in the free space, current-influencing devices are spread between the opposed front sides of the bed, which devices prevent or reduce current peaks in the flow of flush-gas through the bed,
   wherein the flush-gas inlet and the clean-gas outlet are provided in the same front side of the bed and lead into the free space beneath the bed where the current-influencing devices are positioned,
   wherein, during a filtering operation, polluted gas enters the inclined bed diagonally from top to bottom, i.e. from above the inclined bed into the free space beneath the bed, and
   wherein, during a cleaning operation, flush gas enters the free space and flows through the bed from bottom to top.

2. Filtering device in accordance with claim 1, wherein one of the opposed front sides of the bed is closed and another of the opposed front side of the bed is equipped with the clean-gas outlet and the flush-gas inlet.

3. Filtering device in accordance with claim 1, wherein the clean-gas outlet and the flush-gas inlet are configured as a pipe connection.

4. Filtering device in accordance with claim 1, further comprising a plurality of the gas penetrable inclined beds disposed within the filter box, wherein the plurality of beds are positioned in such a fashion that they are placed above and/or next to each other, wherein each bed extends above a free space, wherein the free space is closed gas-tight at its bottom side and on all front sides, and wherein each bed is provided with a switching device for switching between clean gas exiting the free space through the clean-gas outlet and flushing gas entering the free space beneath each bed through the flush-gas inlet, such that one bed may be operable in the cleaning operation and another of the beds may be operable in the filtering operation.

5. Filtering device in accordance with claim 4, further comprising a collecting container, wherein the collecting container is provided for the clean gas which exits from at least one of the clean gas outlets, wherein a plurality of flush-gas connections branches off from the collecting container and each flush-gas connection is in fluid communication with one of the clean-gas outlets associated with one of the beds when the associated switching device is in a position to allow flushing gas to enter the free space beneath each bed, and wherein the clean gas is used as the flush gas.

6. Filtering device in accordance with claim 4, wherein each bed has a number of longitudinal and cross ribs arranged in a base area of the bed in a grid shape, which ribs have a pre-determined height of at least 2 cm, wherein the ribs divide the flush-gas flow into individual flush-gas currents and wherein the currents are vertically supplied to the catalytic material.

7. Filtering device in accordance with claim 6, wherein the ribs extend higher at the side of the bed in the area of the flush-gas inlet than at the opposed front side of the bed, with the ribs being inclined in the direction of flow of the flush-gas current.

8. Filtering device in accordance with claim 1, wherein the filling of catalytic material comprises vanadium pentoxide and filters out dust, and chemically transforms NOx as well as dioxins, and wherein the filling of catalytic material is provided in the form of granules.

9. Filtering device in accordance with claim 1, further comprising a conveyor screw positioned along the bottom of the filter box and extending along the length of the beds, wherein the filling of catalytic material filters out sulfur and compounds of sulfur and wherein a compression layer forms, comprising granules of clogged catalytic material, which slides down via the lower longer side of the bed, will fall over the retaining wall into the area of the conveyor screw for removal.

10. Filtering device in accordance with claim 9, further comprising a treatment device, wherein the conveyor screw supplies granules of clogged catalytic material into the treatment device, and wherein, by means of heating, the treatment device vaporizes and leads off sulfuric and chloric salts, and sieves off or washes out dust.

11. Filtering device in accordance with claim 1, wherein the current-influencing devices comprise air-baffle plates as re directing plates.

\* \* \* \* \*